United States Patent
Maresco

(10) Patent No.: US 10,303,141 B2
(45) Date of Patent: May 28, 2019

(54) DISCOVERY AND IDENTIFICATION OF EQUIPMENT AND OPERATIONAL DATA IN A BUILDING AUTOMATION SYSTEM

(71) Applicant: Siemens Industry, Inc., Alpharetta, GA (US)

(72) Inventor: James Maresco, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 205 days.

(21) Appl. No.: 15/622,600

(22) Filed: Jun. 14, 2017

(65) Prior Publication Data

US 2018/0364659 A1 Dec. 20, 2018

(51) Int. Cl.
G06F 11/30 (2006.01)
G06F 9/44 (2018.01)
G05B 15/02 (2006.01)

(52) U.S. Cl.
CPC ...... *G05B 15/02* (2013.01); *G05B 2219/2642* (2013.01)

(58) Field of Classification Search
USPC .................................................. 709/224, 220
See application file for complete search history.

(56) References Cited

U.S. PATENT DOCUMENTS

| | | | |
|---|---|---|---|
| 7,380,279 B2 * | 5/2008 | Prokupets | G06F 21/32 340/5.7 |
| 8,713,515 B1 * | 4/2014 | Biggerstaff | G06F 8/72 717/104 |
| 2003/0023874 A1 * | 1/2003 | Prokupets | G06F 21/32 726/4 |
| 2004/0002983 A1 * | 1/2004 | Ashida | G06F 16/283 |
| 2006/0058900 A1 | 3/2006 | Johanson et al. | |
| 2015/0198938 A1 | 7/2015 | Steele et al. | |
| 2016/0210569 A1 * | 7/2016 | Enck | G06Q 10/0637 |
| 2016/0370258 A1 * | 12/2016 | Perez | G01M 99/00 |

OTHER PUBLICATIONS

PCT Search Report dated Oct. 17, 2018, for PCT Application No. PCT/US2018/035544, 14 pages.

* cited by examiner

*Primary Examiner* — Jude Jean Gilles

(57) ABSTRACT

An approach for discovery and identification of a subset of equipment operational data from a database associated with a building automation system.

24 Claims, 8 Drawing Sheets

DISCOVERY AND IDENTIFICATION OF EQUIPMENT AND OPERATIONAL DATA IN A BUILDING AUTOMATION SYSTEM

TECHNICAL FIELD

The present invention relates generally to building automation system and more particularly to the identification and collection of equipment and operational meta-data associated with a subsystem in a building automation system.

BACKGROUND

Most modern buildings are built with security systems, emergency systems, heating, ventilating, and air conditioning (HVAC) systems, all of which have many sensors, fans, values, and actuators. These systems together are commonly referred to as building automation systems (BAS). Many of these devices are controlled by microcontroller or microprocessor located in field panels. The programming of each panel is often unique based upon the different devices coupled to the panel. The initial provisioning of a BAS takes multiple hours to layout the design, develop the programming for the panels and other programmable devices, program the devices, tweak the devices, and test the devices and programs. The configuration of the BAS is typically stored in a database accessible by the BAS. Over time, additional changes and modification occur to the BAS and its corresponding database. These changes and modification often occur with different naming conventions and descriptions resulting in similar devices in the BAS using different naming conventions for equipment and data points in the BAS. Thus, in some BAS the naming conventions are not rigidly defined and enforced allowing strings to be used as labels, i.e. "weak naming."

Often different types of tools, such as fault detection tools and performance analysis tools require knowledge of subsets of points (physical and logical elements of a BAS) and hardware subsystems in the BAS to be identified. Further, information about the function and meaning of points and associated meta-data is often required to give meanings for system analytics and such information is not typically embedded in traditional BASs. The identification of such subsets and meta-data is a manual process that is prone to errors due to weak naming conventions and typing used in configuring the BAS.

Known approaches at identification of subsets of a BAS require a strong naming convention and just do not work with a weak naming convention (user defined labels, strings, and identifiers.) In view of the foregoing, there is an ongoing need for systems, apparatuses and methods for correctly identifying items in a BAS database associated with subsystems when weak naming conventions are employed.

SUMMARY

An approach for identification of subsystems of a building automation system (BAS) is implemented and controlled by a process that examines entries in a BAS's database and, via multiple iterations, identifies and maps entries associated with the subsystem. Each of the iteration includes additional suffixes or entries that aid in further identification of database entities. Additionally, unidentified entries and mapping are also identified. Between each iteration, a set of pre-defined approaches are employed to identify and resolve unidentified entries in the database. The resulting identified points, hardware, mappings, and other database elements are then provided as inputs to other tools, such as fault detection and diagnostic tools.

Other devices, apparatus, systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

As used herein, an approach is described for discovery, identification and mapping of equipment, points, and operational data in a building automation system (BAS).

Figure 1:
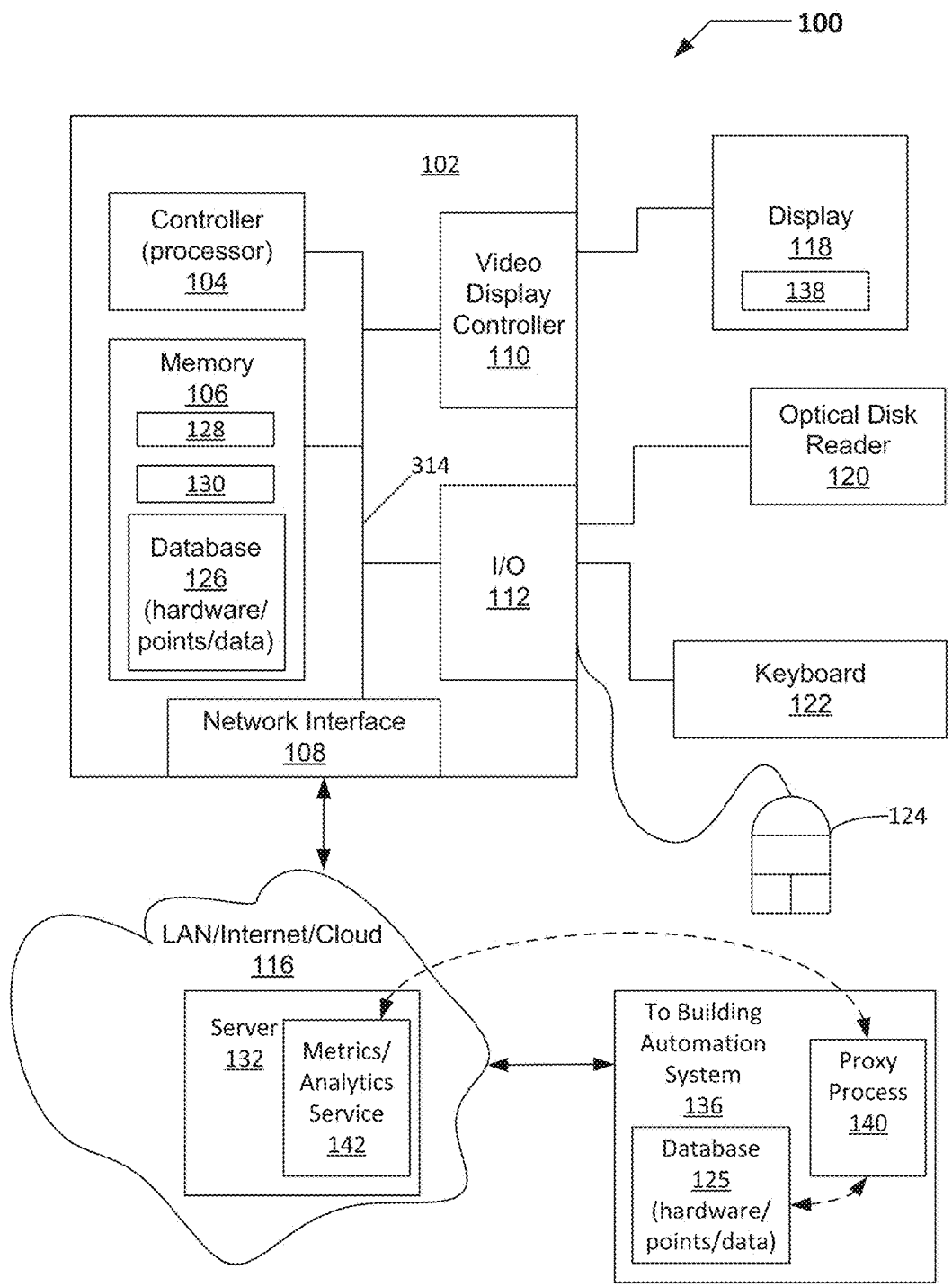
FIG. 1 is an illustration of a processor controlled device that is able to access a database associated with a building automation system (BAS) in accordance with an example implementation of the invention.

Turning to FIG. 1, an illustration 100 of a processor controlled device 102 that is able to access a database 126 associated with a BAS 136 in accordance with an example implementation of the invention. The processor controlled device 102 may have a controller 104 (processor) coupled to a memory 106, network interface 108, video controller 110, and input/output (I/O) interface 112 by address/data bus 114. The network interface 108 may couple the processor controlled device 102 to a network, such as one or more local area networks (LANs)/internet/cloud 116 and servers, such as server 132 located in the cloud, and BAS 136. The connection to the LANs/internet/cloud 116 may be wired or wireless (such as IEEE 802.11g or 802.11n standards). The video controller 110 may be coupled to one or more displays, such as display 118. The display is typically a digital video display, such as HD television or VGA computer display. The I/O interface 112 may be coupled to a keyboard 122, optical disk reader 120, and mouse 124.

The controller 104 executes instructions that may be stored in memory 106 that facilitate the operation of the processor controlled device 102. The memory 106 may be logically or physically split into an operational memory 128 that provide operational instructions for the processor controlled device 102 and an application memory 130. The memory 106 may have one or more databases, such as database 126 stored therein for access by the application when executed by the controller 104 stored in application memory 130. In other implementations, the application memory 130 may be dedicated to one application. An initial naming convention may initially be loaded into application memory 130, where the initial naming definition file is a typical approach to naming different elements in the database 126 and contains partial names, such as suffixes and/or strings of text.

The database 126 is copied from database 125 in BAS 136 and may be downloaded or otherwise copied into memory 106 by the controller 104. In other implementations, the database 125 may be read in real-time from the BAS or server servicing the BAS located in the cloud or an external network. In yet other implementations, the database from the BAS 136 may have been previously stored in the memory or disk storage of server 132. The database 125 and copy 126 contain element and configuration data for the BAS 136, including hardware, points, and associated data.

The BAS 136 may also have a proxy process 140 that sends collected data from the BAS 136 to a metrics/analytics service (MAS) 142 that is implemented on server 132. The MAS 142 in other implementations may be internal to the BAS 136. In yet other implementations, the MAS 142 may be implemented on a remote device, such as processor controlled device 102. The collected data may be real time data or data stored in database 125 and periodically sent via the proxy process 140 to the metrics/analytics service 142.

The application in application memory 130 is executed by the controller 104 and results in a graphical user interface 138 appearing on display 118 for identification of the elements that comprise a subsystem of the BAS 136. The elements may include points, panels, hardware, and data associated with the subsystems, such as the simplified subsystem of FIG. 2.

Figure 2:
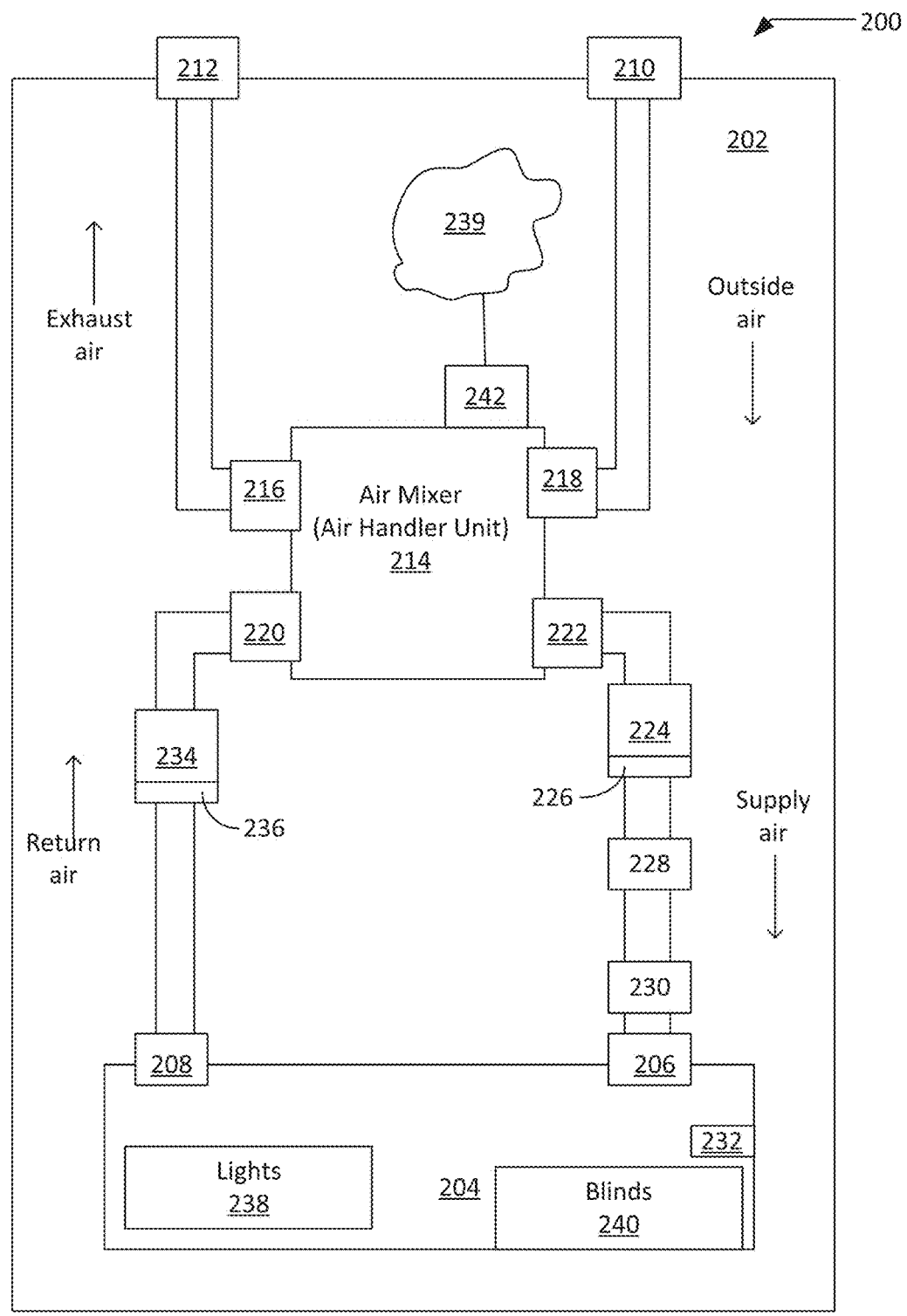
FIG. 2 is a graphical illustration of a HVAC building air handler subsystem implementation in accordance with an example implementation of the invention.

In FIG. 2, a graphical illustration of a HVAC building implementation 200 in accordance with an example implementation of the invention is depicted. A building 202 with a room 204 has a supply air vent 206 and return air vent 208. Outside air is brought into the building via an outside inlet vent 210 and exhausted via outside exhaust vent 212. An air mixer 214 may have an exhaust air damper 216, outdoor air damper 218, return air damper 220, and supply air damper 222. A supply fan 224 may aid in moving the supply air and have a supply variable frequency drive 226. A heating supply control valve 228 may control the heating of the supply air and similarly a supply air cooling valve 230 may control the cooling of the supply air, and thermostat 232 may also be present in room 204. Return air exits the room 204 via the return air vent 208 and may be aided by return fan 234 that may be controlled by return variable frequency drive 236. The return air enters the air mixer 214 via return air damper 220. The room 204 may also have lighting control 238 and blind control 240 as shown in FIG. 2. All the devices may be controlled by one or more field panels, such as panel 242 that control the different elements of the BAS 136. The field panel may be directly or indirectly coupled to a building's telecommunication network 239 and/or the internet/cloud. The field panel may have one or microcontrollers that are programmed to operate the different components of the BAS 136.

Figure 3:
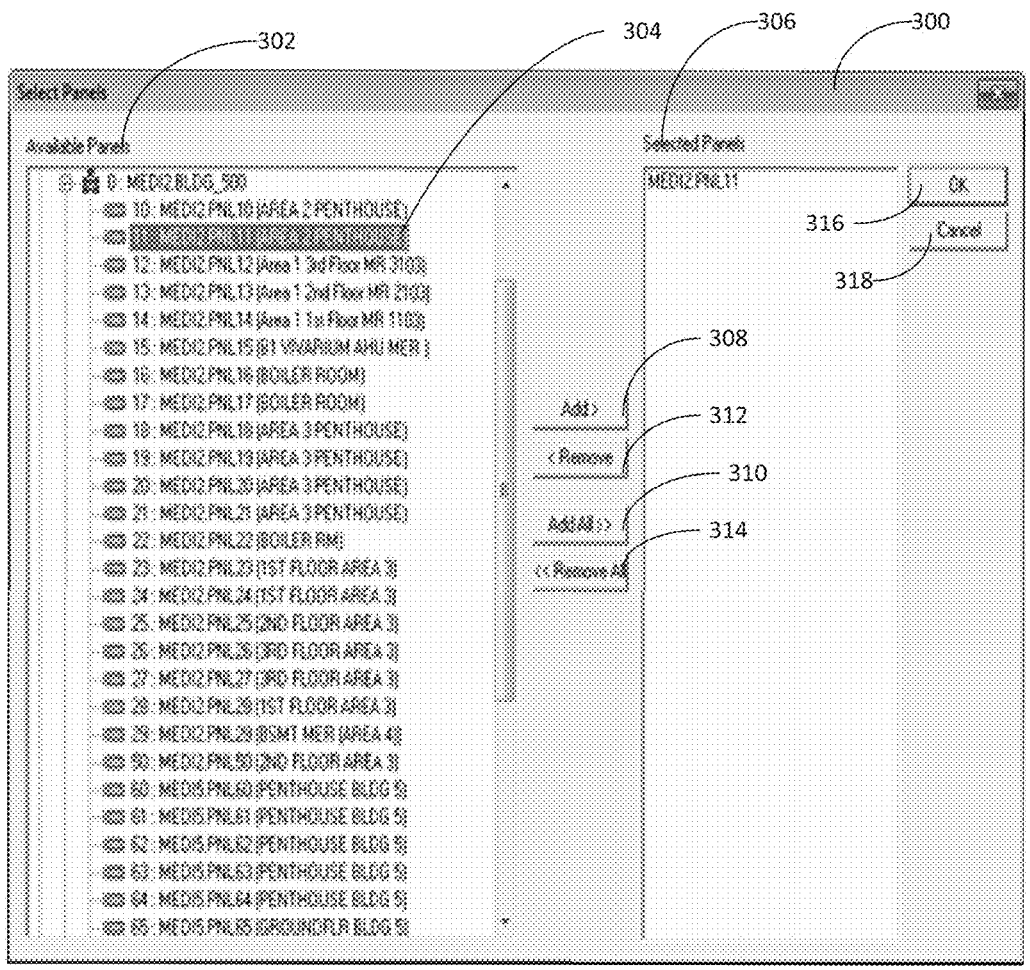
FIG. 3 is a graphical user interface controlled by the processor of FIG. 1 depicting a list of available panels associated with a subsystem in the BAS having unidentified items in accordance with an example implementation of the invention.

Turning to FIG. 3, a graphical user interface (GUI) 300 controlled by the processor of FIG. 1 depicting a list of available panels 302 associated with a subsystem in the BAS 136 having unidentified items in accordance with an example implementation of the invention is illustrated. A panel 304 is selected from the list of available panels 304. The panel is added to the list of selected panels 306 with an "Add" button 308 in the current implementations. Other approaches for selecting items may be employed, such as check boxes, drag-and-drop, or other known graphical user interface selection approaches. A button, such as "Add All" button 310, may be available to add all panels in the list of available panels 302. Similarly, items such as panels may be selected in the list of selected panels 306 and buttons may be available for removing the selected panels from the list of selected panels 306. Examples of such buttons include the "Remove" button 312 and "Remove All" button 314. In other implementations, other known approaches for selecting and removing items in a graphical user interface may be employed. Once all the desired selection have been made for an area or set of equipment, such as air handler of FIG. 2, the selection can be committed or otherwise accepted using an "OK" button 316. If a user desire's to not to continue, the "Cancel" button may be selected.

Figure 4:
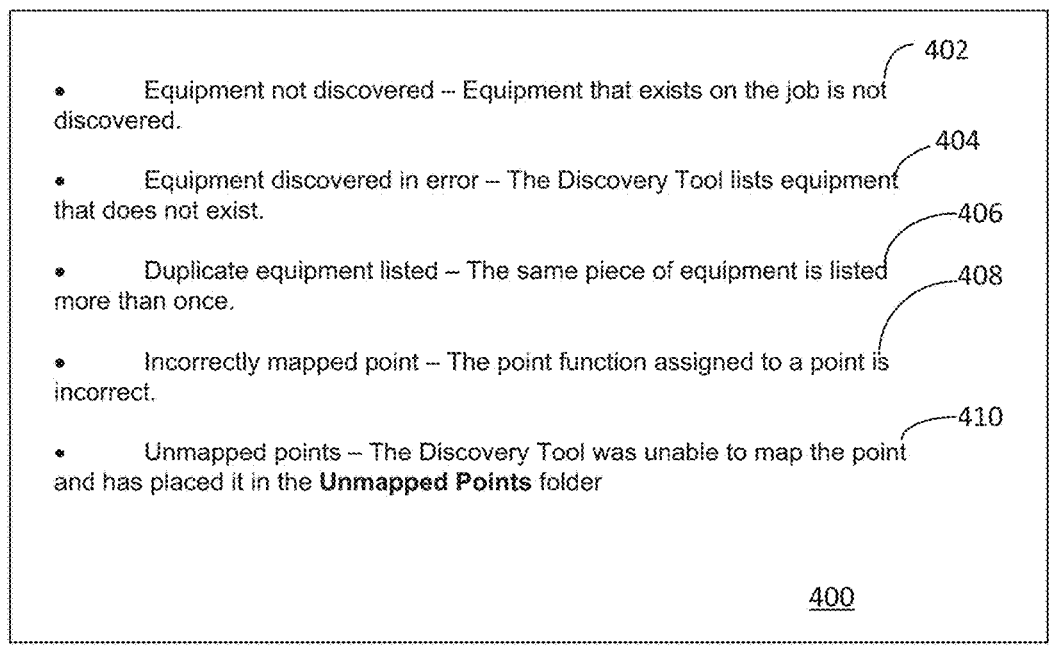
FIG. 4 is a list of approaches for identifying associations (i.e. mappings) between items in a subsystem of the BAS of FIG. 1 in accordance with an example implementation of the invention.

Once the items, such as the panels for the air handler of FIG. 2 are selected and accepted, the associated equipment and points in the database are discovered with the aid of an initial definition file. Unlike approaches with strong naming types, weak naming allows names to be user defined strings in the database and associations to be undiscoverable even with an initial definition file. In order to resolve undiscovered associations, a plurality of approaches is implemented. In FIG. 4, a list of approaches 400 for identifying associations (i.e. mappings) between items in a subsystem of the BAS 136 of FIG. 1 in accordance with an example implementation of the invention is depicted. There are five possible results from the selection that occurred in FIG. 3. First, equipment, such as any device 208-240 in FIG. 2, may not be discovered 402. For example, equipment or items that exist in the subsystem of the BAS 136 are not discovered from the selected items or panel. Second, equipment or items are discovered in error 404. For example, equipment or items are listed in response to the selection using GUI 300 that do not really exist. Third, in response to the selection using GUI 300 duplicate equipment is listed 406. The same piece of equipment is listed more than once in response to the selection using GUI 300. Fourth, incorrectly mapped points associated with the selected panels 408. The point function assigned to a point is incorrectly mapped in response to the selection using GUI 300. The fifth possible result is points are unmapped 410 to any panel or item. The selected panels in FIG. 3 results in a plurality of point mappings, but some points are unmapped.

Figure 5:
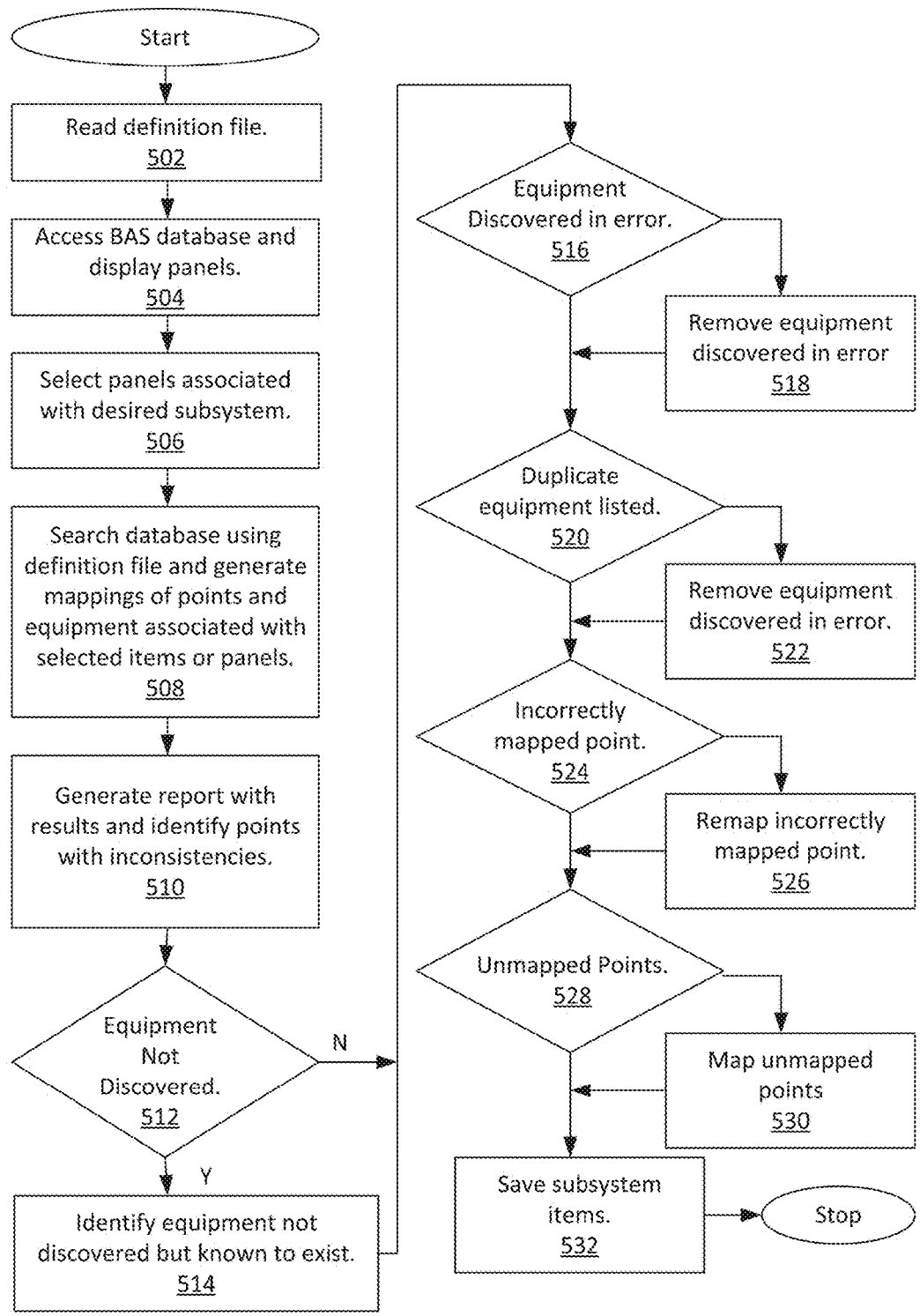
FIG. 5 is a flow diagram of an approach to identify unidentified items associated with a subsystem of a BAS of FIG. 1 in accordance with an example implementation of the invention.

Turning to FIG. 5, a flow diagram 500 of an approach to identify unidentified items associated with a subsystem of a BAS 136 of FIG. 1 in accordance with an example implementation of the invention is illustrated. The controller 104 executes the application from the application memory 130 that reads a definition file 502. The copy of the database is accessed in step 504 and a listing of panels is provided in the GUI 300 of FIG. 3. Panels or elements are selected in step 506 associated with an area in the building or subsystem of the BAS 136. The controller then searches the copy of the BAS 136 database 126 using the definition file and generates mappings of points and equipment associated with selected items or panels or elements in step 508. A report with results is then generated that includes points with inconsistencies that need for further processing or missing points in step 510. If equipment associated with the selected panels is not discovered in step 512 and is known to exist, then the equipment not discovered but known to exist is identified in step 514. If equipment is identified as being discovered in error in step 516, then the erroneous equipment is removed from the list of subsystem equipment and points in step 518. If duplicate equipment is identified in step 520, it is removed in step 522 from the list of subsystem equipment and points. In some implementations, steps 522 include merging duplicate equipment and combining of their mappings. If equipment is identified as unmapped in the resulting list of subsystem equipment and points 528, then the unmapped points are mapped in step 530. The resulting list of points that has been modified to resolve at least a portion of the inconsistencies in the list of mappings that result in a complete list of mappings and unmapped points for the desired room or subsystem may then be saved in step 532. In other implementations, the order of the checking and/or corrections to the list may be done in a different order or with less than five checks for the resulting list of points and equipment.

Figure 6:
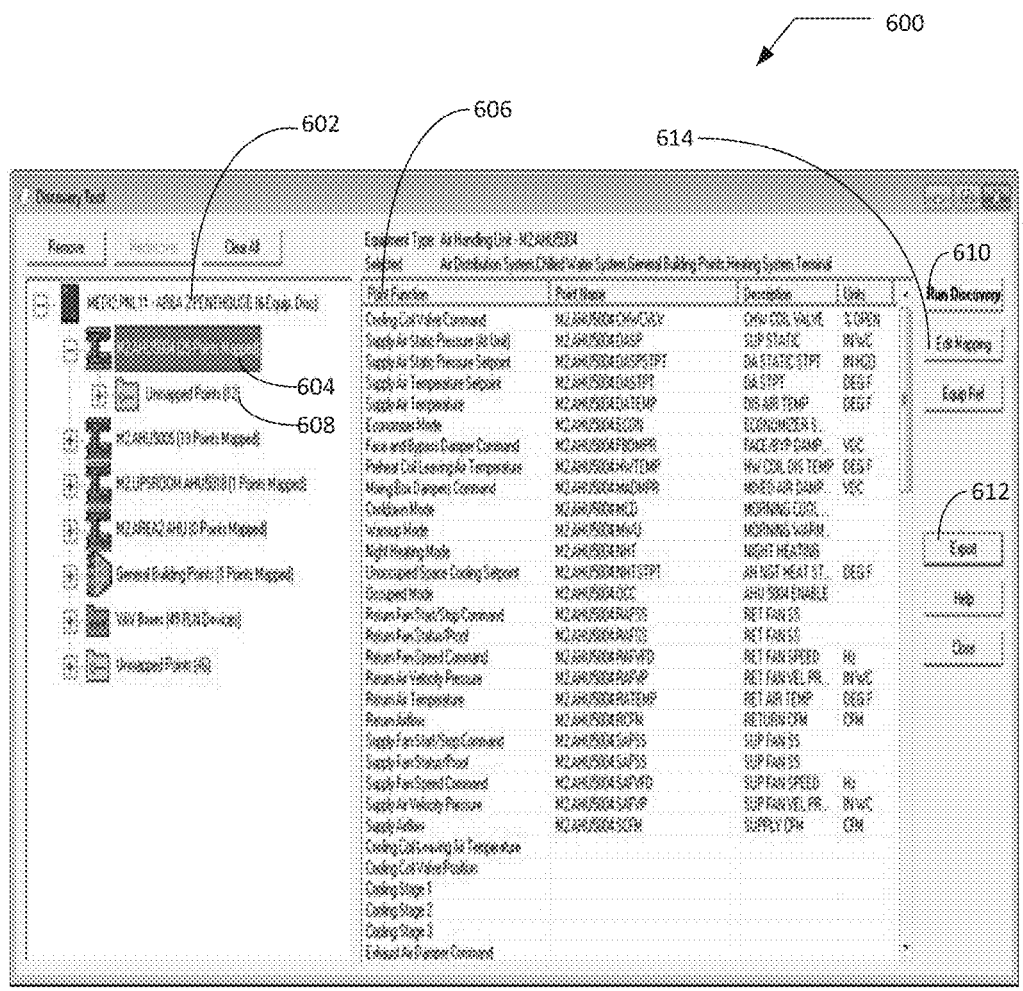
FIG. 6 is a graphical user interface (GUI) depicting a first iteration of selecting elements associated with the selected air handler subsystem of FIG. 3 in accordance with an example implementation.

In FIG. 6, a graphical user interface (GUI) 600 depicting a first iteration of selecting elements 602 associated with the selected air handler 300 subsystem of FIG. 3 in accordance with an example implementation is depicted. When the air handler 604 is selected in the GUI 600 and discovery is run via the "Run Discovery" button 610 a listing of point functions 606 is provided via the mappings of points and functions present in the database. Unmapped points or elements 608 are also depicted that appear to be mapped to the air handler 604. If all elements or points are correct and the subsystem mapping are complete, then the resulting list of elements may be exported using the "Export" button 612. Unmapped point functions 608 of the air handler 604 are mapped using the "Edit Mapping" button 614 and associations or mappings entered.

Figure 7:
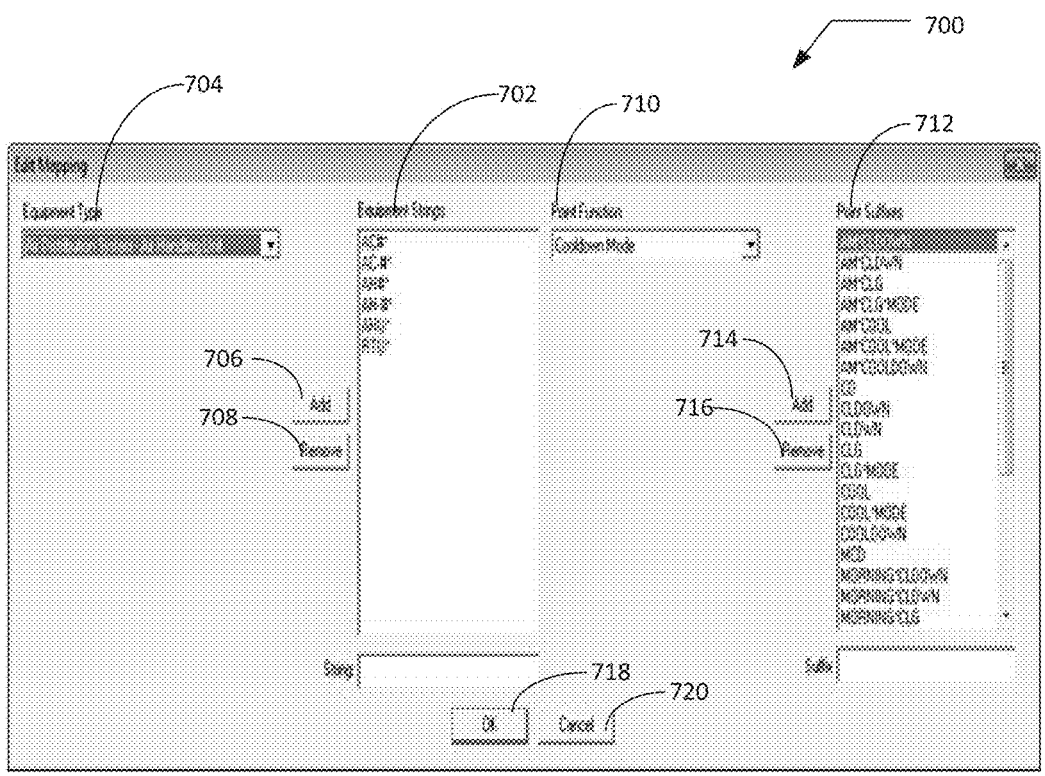
FIG. 7 is a graphical user interface depicting the approach of unidentified elements being mapped via the "Edit Mapping" button of FIG. 6 not discovered in accordance with an example implementation.

Turning to FIG. 7 a graphical user interface 700 depicting the approach of unidentified elements being mapped via the "Edit Mapping" button of FIG. 6 not discovered in accordance with an example implementation is depicted. The identified unknown equipment strings 702 are listed for the equipment type 704. The process of identification of equipment strings may employ classifiers, such as Multinomial Naïve Bayes and Random Forest. Equipment strings may be added or removed 706, 708. Equipment strings 702 may each be individually associated or mapped with a point function 710. Similarly, point suffixes 712 may be added 714 or removed 716 to further map the unmapped points or items. Once the mappings are complete, they may be committed or saved by selecting the "OK" button 718 or cancelled with the "Cancel" button 720. Thus, equipment strings may be added, removed, point function mapped, and point suffixes added and removed to resolve unmapped or mismapped elements.

Figure 8:
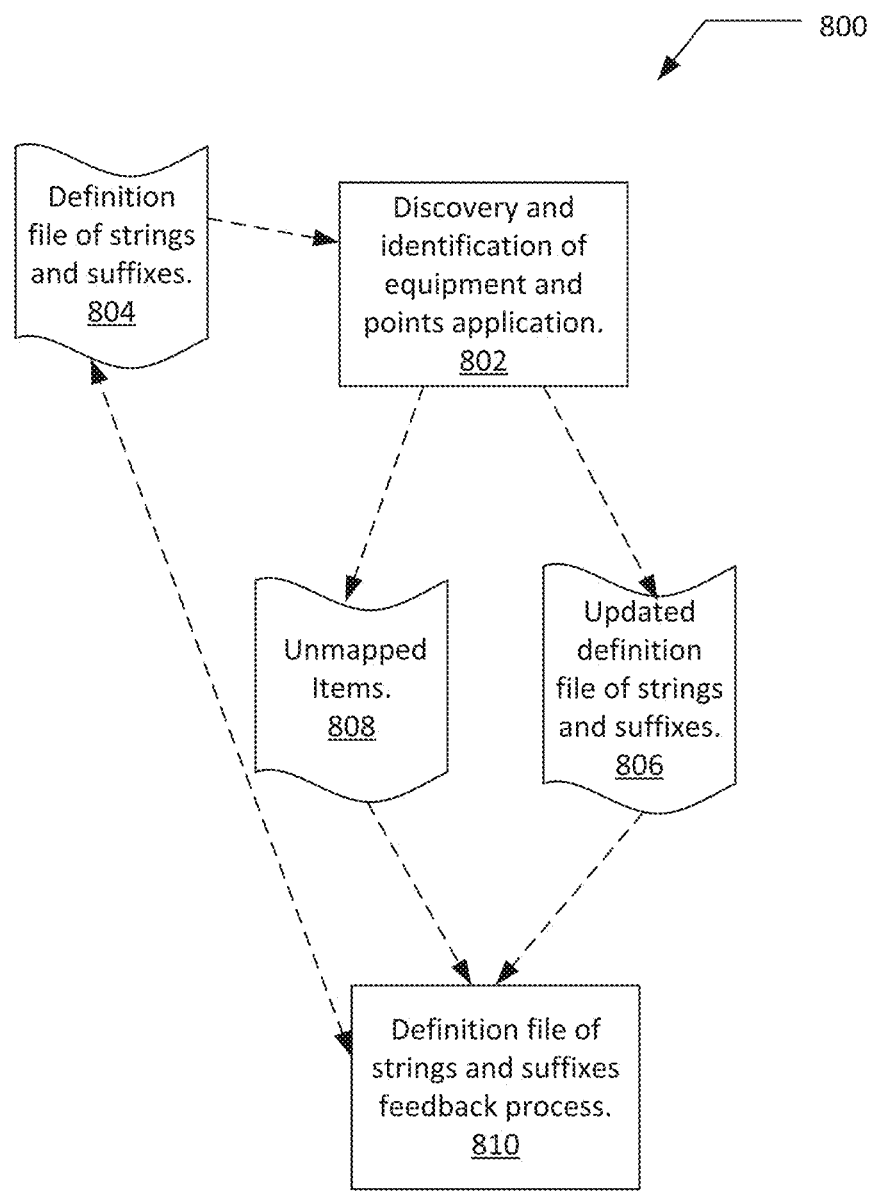
FIG. 8 is a diagram of the updating of the definition file of strings and suffixes based upon the output of the discovery and identification of equipment and points application that resides in application memory of FIG. 1 in accordance with an example implementation.

In FIG. 8, a diagram 800 of the updating 810 of the definition file 804 of strings and suffixes 804 based upon the output of the discovery and identification of equipment and points application 802 that resides in application memory 130 FIG. 1 in accordance with an example implementation is depicted. A subsystem or location in a BAS 136 is selected using the discovery and identification of equipment and points application 802 using the definition file of strings and suffixes 804 resulting in an updated definition file of strings and suffixes 806 and in some cases unmapped items 808 that were not part of the selected subsystem or location. A definition file of strings and suffixes feedback process 810 is executed by the controller 104 using the updated definition file of strings and suffixes 806 and in some implementations portions of strings and suffixes from the unmapped items 808 as input. In order to identify strings and suffixes, approaches such as Random Forest Test Classification or Multinomial Naïve Bayes Text classification may be used to add new strings for classifying points and elements for use in mappings. That file is divided into training data and test data. The training data is used along with the definition file of strings and suffixes 804 and different types of weighting algorithms, such as are available in the PYTHON programming language are applied to the training data and definition file of strings and suffixes 804 resulting in an updated definition file of strings and suffixes that are used with the test data and the discovery and identification of equipment and points application 802 to verify an improvement in performance of using the updated file. If an improvement in performance is achieved, the updated definition file of strings and suffixes replaces the current definition file of strings and suffixes 804.

In other implementations, the definition file of strings and suffixes 804 may be stored in a library with multiple flavors or versions. Each flavor or version may be associated with an engineer, engineering group, installer of the BAS, manufacturer of the BAS, size of the BAS, or similar attribute. Such attributes may be contained in the database of the BAS 136. The definition file of strings and suffixes 804 or library of definition files of strings and suffixes may be stored on one or more servers located in the cloud, such as server 132.

It will be understood, and is appreciated by persons skilled in the art, that one or more processes, sub-processes, or process steps described in connection with FIG. 5 may be performed by hardware and/or software (machine readable instructions). If the approach is performed by software, the software may reside in application memory in a suitable electronic processing component or system such as one or more of the functional components or modules schematically depicted in the figures.

The software in the application memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any tangible computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for discovery and identification of equipment and operational data in a building automation system has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method for discovery and identification of equipment and operational data in a building automation system (BAS), comprising:
   reading a definition file into memory by a processor;
   accessing a database of elements of the BAS;
   selecting a subsystem of the BAS defined by a portion of elements from the database of elements;
   generating with the processor a list of mappings associated with the subsystem from the database of elements, where elements in the database of elements have weak naming;
   identifying inconsistencies in the list of mappings associated with the subsystem; and
   modifying at least one definition in the definition file to resolve at least a portion of the inconsistencies in the list of mappings that result in a complete list of mappings and list of unmapped points.

2. The method for discovery and identification of equipment and operational data in the BAS of claim 1 where modifying at least one definition further includes, the processor adding a missing element to the complete list of mappings.

3. The method for discovery and identification of equipment and operational data in the BAS of claim 1 where resolving inconsistencies further includes, the processor removing an element from the complete list of mappings that does not exist in the subsystem.

4. The method for discovery and identification of equipment and operational data in the BAS of claim 1 where resolving inconsistencies further includes, the processor removing a duplicate entity from the complete list of mappings.

5. The method for discovery and identification of equipment and operational data in the BAS of claim 1 where resolving inconsistencies further includes, the processor reassigning a function to a point from the complete list of mappings.

6. The method for discovery and identification of equipment and operational data in the BAS of claim 1 where resolving inconsistencies further includes, the processor removing a duplicate entity from the complete list of mappings.

7. The method for discovery and identification of equipment and operational data in the BAS of claim 1 where reading the database of element further includes copying the database of the BAS to the database of elements.

8. The method for discovery and identification of equipment and operational data in the BAS of claim 1 includes, updating the definition file in response to the processor with at least a portion of text strings in the complete list of mappings.

9. An apparatus for discovery and identification of equipment and operational data in a building automation system (BAS), comprising:
   a processor;
   a memory coupled to the processor that stores a definition file;
   a graphical user interface (GUI) depicted in a display that is coupled to a processor, were the graphical user interface displays elements from a database of the BAS, where a subsystem of the BAS is selected via the graphical user interface;
   a list of mappings generated by the processor of elements associated with the subsystem from the database and displayed in the graphical user interface, where elements of the database have weak names; and
   a complete list of mappings and list of unmapped points generated by the processor where the complete list of mappings includes at least one unmapped points from the list of unmapped points that is mapped via the GUI.

10. The apparatus of claim 9 where resolution of at least a portion of the inconsistences further includes, a missing element added to the complete list of mappings by the processor.

11. The apparatus of claim 9 where resolution of at least a portion of the inconsistences further includes, an element removed from the complete list of mappings that does not exist in the subsystem by the processor.

12. The apparatus of claim 9 where resolution of at least a portion of the inconsistences further includes, a duplicate entity removed from the complete list of mappings by the processor.

13. The apparatus of claim 9 where resolution of at least a portion of the inconsistences further includes, a function reassigned to a point from the complete list of mappings by the processor.

14. The apparatus of claim 9 where resolution of at least a portion of the inconsistences further includes, a duplicate entity removed from the complete list of mappings by the processor.

15. The apparatus of claim 9 where resolution of at least a portion of the inconsistences further includes, a BAS database copied by the processor to create the database of elements.

16. The apparatus of claim 1 includes, at least a portion of text strings in the complete list of mappings used by the processor to update the definition file with the generation of the complete list of mappings.

17. A non-transient computer readable media with a plurality of instructions that when executed perform a method for discovery and identification of equipment and operational data in a building automation system (BAS), comprising:

reading a definition file into memory by a processor;
accessing a database of element of the BAS;
selecting a subsystem of the BAS;
generating with the processor a list of mappings associated with the subsystem from the database of elements, where elements in the database of elements have weak naming;
identifying inconsistencies in the list of mappings associated with the subsystem; and
modifying at least one definition in the definition file to resolve at least a portion of the inconsistencies in the list of mappings that result in a complete list of mappings and list of unmapped points.

18. The non-transient computer readable media with a plurality of instructions that when executed perform the method for discovery and identification of equipment and operational data in the BAS of claim 17 where resolving inconsistencies further includes, the processor adding a missing element to the complete list of mappings.

19. The non-transient computer readable media with a plurality of instructions that when executed perform the method for discovery and identification of equipment and operational data in the BAS of claim 17 where resolving inconsistencies further includes, the processor removing an element from the complete list of mappings that does not exist in the subsystem.

20. The non-transient computer readable media with a plurality of instructions that when executed perform the method for discovery and identification of equipment and operational data in the BAS of claim 17 where resolving inconsistencies further includes, the processor removing a duplicate entity from the complete list of mappings.

21. The non-transient computer readable media with a plurality of instructions that when executed perform the method for discovery and identification of equipment and operational data in the BAS of claim 17 where resolving inconsistencies further includes, the processor reassigning a function to a point from the complete list of mappings.

22. The non-transient computer readable media with a plurality of instructions that when executed perform the method for discovery and identification of equipment and operational data in the BAS of claim 17 where resolving inconsistencies further includes, the processor removing a duplicate entity from the complete list of mappings.

23. The non-transient computer readable media with a plurality of instructions that when executed perform the method for discovery and identification of equipment and operational data in the BAS of claim 17 where reading the database of element further includes copying the database of the BAS to the database of elements.

24. The non-transient computer readable media with a plurality of instructions that when executed perform the method for discovery and identification of equipment and operational data in the BAS of claim 17 includes, updating the definition file in response to the processor with at least a portion of text strings in the complete list of mappings.

* * * * *